(12) United States Patent
Kobayashi et al.

(10) Patent No.: US 11,865,988 B2
(45) Date of Patent: Jan. 9, 2024

(54) AIRBAG DEVICE AND METHOD FOR MANUFACTURING THE SAME

(71) Applicant: Autoliv Development AB, Vargarda (SE)

(72) Inventors: Yuto Kobayashi, Ibaraki (JP); Tsutomu Sakurai, Ibaraki (JP); Tomofumi Tochigi, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/047,509

(22) Filed: Oct. 18, 2022

(65) Prior Publication Data
US 2023/0182673 A1    Jun. 15, 2023

(30) Foreign Application Priority Data
Oct. 23, 2021  (JP) .................................. 2021-173550

(51) Int. Cl.
*B60R 21/207*  (2006.01)
*B60R 21/2342*  (2011.01)

(52) U.S. Cl.
CPC ........ B60R 21/207 (2013.01); B60R 21/2342 (2013.01)

(58) Field of Classification Search
CPC .................................................. B60R 21/207
See application file for complete search history.

(56) References Cited

U.S. PATENT DOCUMENTS

| | | | | |
|---|---|---|---|---|
| 11,214,223 | B2* | 1/2022 | Kobayashi | ........ B60R 21/23138 |
| 11,505,156 | B2* | 11/2022 | Kabeya | ................. B60R 21/235 |
| 2023/0192022 | A1* | 6/2023 | Kobayashi | ........... B60R 21/2165 |
| | | | | 280/728.1 |

FOREIGN PATENT DOCUMENTS

| | | | | |
|---|---|---|---|---|
| JP | 2015081082 A | * | 4/2015 | ............. B60R 21/16 |
| JP | 2021169262 A | * | 10/2021 | ........... B60R 21/264 |
| KR | 20220151984 A | * | 11/2022 | ........... B60R 21/207 |
| WO | WO-2021251303 A1 | * | 12/2021 | ........... B60R 21/213 |

* cited by examiner

*Primary Examiner* — Faye M Fleming
(74) *Attorney, Agent, or Firm* — Harness, Dickey & Pierce, P.L.C.; Stephen T. Olson

(57) ABSTRACT

PROBLEM:
To provide a side airbag device that can be stored compactly.
RESOLUTION MEANS
The present invention is an airbag device to be stowed in a vehicle seat, comprising:
an airbag cushion that restrains an occupant by expanding and deploying;
an inflator arranged on the inner side of the seat frame which supplies expansion gas to the airbag cushion; and
a cover member made of a ductile material that melts and shrinks under heat and pressure to retain the airbag cushion. The airbag cushion includes a rear chamber section where the inflator is stowed, and a front chamber section that extends forward from the rear chamber section that is arranged outside of the seat frame when stowed. The cover member is then configured to heat and pressurize the region corresponding to the front chamber section of the airbag cushion, thereby pressurizing and retaining the relevant section of the airbag cushion.

15 Claims, 15 Drawing Sheets

A1-A1 cross section

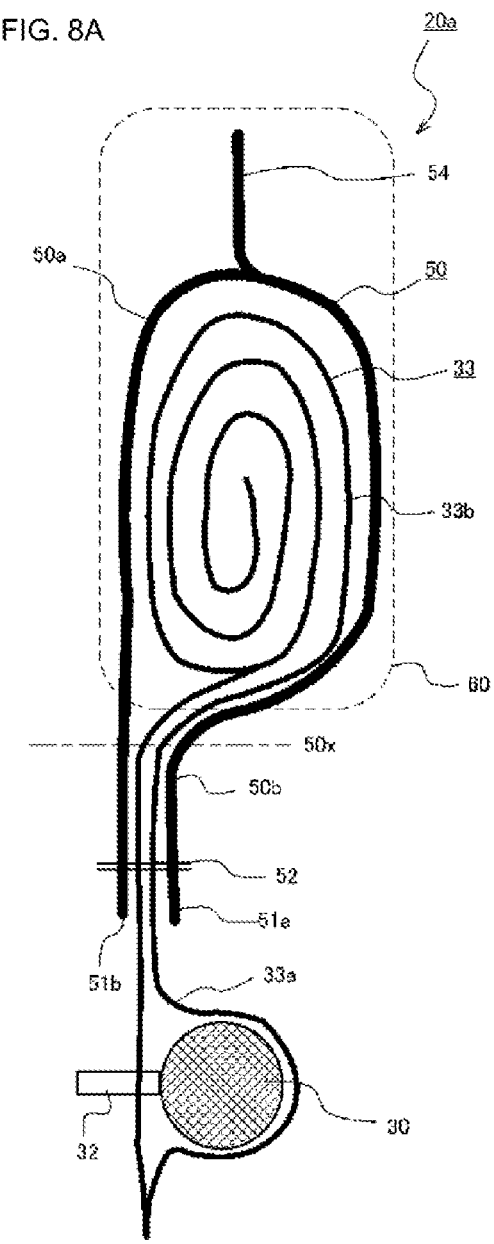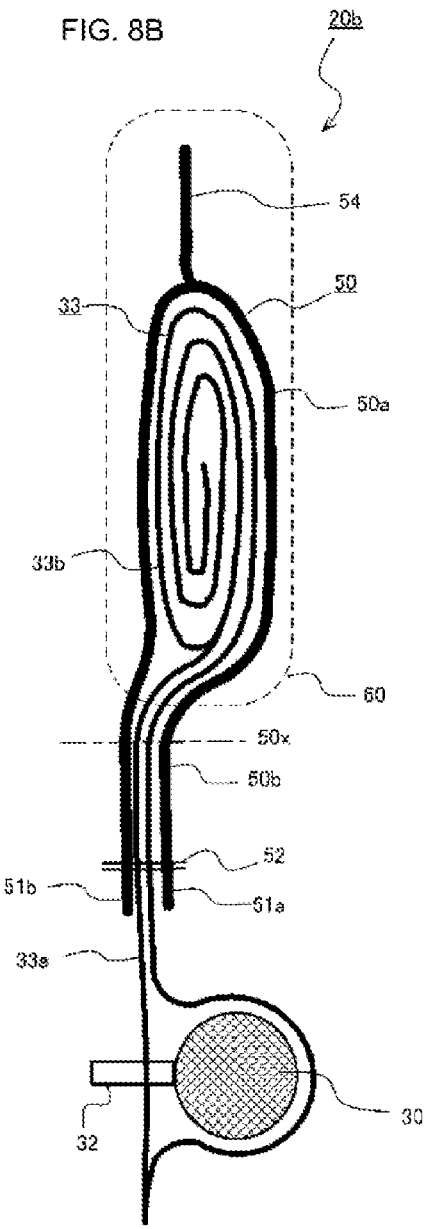

Embodiment 1

Embodiment 2

Embodiment 2

Embodiment 3

Embodiment 3

Embodiment 4

Embodiment 4

AIRBAG DEVICE AND METHOD FOR MANUFACTURING THE SAME

TECHNICAL FIELD

The present invention relates to a side airbag device mounted to a vehicle seat and a manufacturing method thereof.

BACKGROUND TECHNOLOGY

In order to protect occupants in the event of a vehicle collision, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of an automobile so as to protect occupants during collisions in a lateral direction of the vehicle, as well as when overturning and during rollover accidents; and a side airbag stored in a side port of a seat which is deployed between the occupant and a side panel so as to protect the occupant upon impact in the lateral direction of the vehicle. The present invention primarily relates to a side airbag device.

The side airbag device is stowed in a side supporting part of a seat. Therefore, there are many restrictions on the shape and size, and thus the airbag device packaging must be compact. Therefore, a method has been proposed in which the airbag is folded or rolled to be compressed, covered with a flexible cover, and attached to the seat frame. In this case, when the airbag starts to expand by expansion gas, the cover breaks and the airbag expands greatly to the outside.

However, by holding the airbag compressed by the cover as was done conventionally, the airbag cannot be sufficiently compact, and increased compactness is needed.

In particular, in a case where the inflator is included inside the seat frame and the compressed airbag is included outside of the seat frame, the airbag is difficult to stow in a compact manner.

Also, although a method is proposed where a hard plastic cover is included around a folded or rolled airbag, this manner of hard cover would not only significantly increase the cost and weight of the airbag unit, but the volume of the packaged airbag cannot be made sufficiently small.

SUMMARY OF THE INVENTION

Problem to be Solved by the Invention

In light of the conditions described above, an object of the present invention is to provide an airbag device that can be compactly stowed in a vehicle seat.

Another object of the present invention is to provide a manufacturing method of an airbag device that can be compactly stowed in a vehicle seat.

Means for Solving the Problems

First Aspect

In order to achieve the above object, a first aspect of the present invention is an airbag device to be stowed in a vehicle seat, containing:

an airbag cushion that restrains an occupant by expanding and deploying;

an inflator arranged on the inner side of the seat frame which supplies expansion gas to the airbag cushion; and a cover member formed of a ductile material that melts and shrinks under heat and pressure to retain the airbag cushion. The airbag cushion includes a rear chamber section where the inflator is stowed, and a front chamber section that extends forward from the rear chamber section that is arranged outside of the seat frame when stowed. The cover member is then configured to heat and pressurize the region corresponding to the front chamber section of the airbag cushion, thereby pressurizing and retaining the relevant section of the airbag cushion.

Here, "heating and pressurizing" means that the cover member that retains the airbag cushion is pressurized in a heated state using a mold or the like.

Also, "ductile material" refers to a material composition that provides mobility or elastic properties to the fiber of the fabric, or a material of a fibrous structure having flexible or elastic properties. Due to the mobility or elasticity of the material, the fabric of the ductile material will be adhered to the inner surface of the mold cavity in a heating and pressurizing step.

As described above, in the present invention, the region corresponding to at least the front chamber section of the airbag cushion is heated and pressurized with respect to the cover member retaining the airbag cushion to compress and retain the relevant section of the airbag cushion. In other words, this accounts for a major section of the airbag cushion, by retaining the section arranged on the outer side of the seat frame in a compressed state by the cover member. At this time, since the heated and pressurized cover member melts and shrinks, the relevant section of the cover member becomes harder than the other sections, improving the form retaining properties thereof. On the other hand, the rear chamber section housing the inflator is not compressed via the cover member, and thus maintains a relatively flexible state, and is easily bent.

The front chamber section of the airbag cushion can be stowed in a rolled or folded state.

The airbag cushion when stowed may have a form having a bent part that bends in between the front chamber section and the rear chamber section at a front edge section of the seat frame.

Preferably, the cover member is not heated and pressurized in the location corresponding to the bent part of the airbag cushion. As a result, flexibility of the bent part is ensured, the airbag cushion can be easily bent, and the airbag cushion can be stowed in a state of close contact with the seat frame.

The cover member is composed of a ductile cloth material containing a plurality of polymer fibers, and can be configured to be able to retain a prescribed shape by at least a part of the fibers being fused together.

The cover member can be configured to include at least a front cover region surrounding the front chamber section of the airbag cushion, and a rear cover region extending behind the front cover region and covering at least a section of the rear chamber section of the airbag cushion. The rear cover region can then be shaped to include a first rear end part located inside the rear end of the cover member and a second rear end part located on the outside.

The inflator is configured to be secured to the seat frame by stud bolts, and the end part of the front cover region of the cover member is preferably provided with a tab connected to the stud bolts passing through the outer side of the seat frame.

By heating and pressurizing the tab, the hardness thereof can be increased to be more easily connected to the stud bolts.

Both the first and second rear end parts of the cover member may be configured to be coupled by breakable stitching to the rear chamber section of the airbag cushion.

In this case, when the airbag cushion starts to expand and deploy, the stitching point breaks, and the cover member releases retention of the airbag cushion in the compressed state.

The second rear end part of the cover member can be secured to the stud bolts on the inner side of the seat frame.

In this case, the attachment position of the airbag assembly including the airbag cushion, and the cover member can easily be maintained along with the desired position and orientation without any offset.

The first rear end part of the cover member can be coupled by stitching with respect to the rear chamber section of the airbag cushion.

A frangible slit may be formed in the first rear end part of the cover member in the vicinity of the stitching.

In this case, when the airbag cushion starts to deploy, by ensuring that the cover member is reliably separated therefrom, it is possible to minimize interference with the airbag cushion.

Both the first rear end part and the second rear end part may be configured to be secured to the stud bolts such that the rear cover region of the cover member surrounds the rear chamber section of the airbag cushion.

In this case, the airbag cushion, the cover member, the attachment position of the airbag assembly including the inflator, and the attachment orientation can be maintained in a more preferred state.

A slit can be formed in a section of the rear cover region of the cover member.

Second Aspect

The second aspect of the present invention is a manufacturing method of an airbag device stowed in a vehicle seat, including:
  a step of stowing an inflator in a rear chamber section of an airbag cushion,
  a step of compressing a front chamber section of the airbag cushion in a rolled or folded state,
  a step of forming a first intermediate package by arranging a cover member made of a ductile material that melts and shrinks under heat and pressure so as to cover at least a part of the front chamber section and rear chamber section,
  a step of forming a second intermediate package by heating and pressurizing
  a part of the cover member and further compressing the front chamber section of the airbag cushion,
  a step of securing the inflator on the inner side of the seat frame,
  a step of forming a bend in between the front chamber section and rear chamber section of the airbag cushion and arranging the front chamber section on the outer side of the seat frame, and
  a step of connecting the end part of the cover member to the seat frame.

In the specification and claims of the present application, the direction in which the occupant is facing (the direction of vehicle travel) when the occupant is seated in the seat in a normal posture is referred to as "forward" and the opposite direction is referred to as "rear", and the axis of the coordinates are referred to as the "front-rear direction". Moreover, when the passenger is seated in the seat in a regular posture, the right of the passenger is referred to as the "right direction," the left of the passenger is referred to as the "left direction," and the direction indicating the coordinate axis is referred to as the "left and right direction." In the left-right direction, a region on an occupant side from a side frame of the seat shall be referred to as "inside", and a region opposite from the occupant as viewed from the side frame shall be referred to as "outside". Similarly, when the passenger is seated in the seat in a regular posture, the head direction of the passenger is referred to as "up," the waist direction of the passenger is referred to as "down," and the direction indicating the coordinate axis is referred to as the "vertical direction."

BRIEF DESCRIPTION OF THE DRAWINGS

FIG. 6(A) and FIG. 6(B) are the front and rear respectively.

FIGS. 8(A) and 8(B) is a cross-sectional view illustrating the structure of the airbag cushion and the cover member according to Embodiment 1, where FIG. 8(A) illustrates the state before the heating and pressurizing step, and FIG. 8(B) illustrates the state after the heating and pressurizing step.

MODE FOR CARRYING OUT THE INVENTION

An airbag device according to embodiments of the present invention will be described below with reference to the accompanying drawings.

Figure 1:
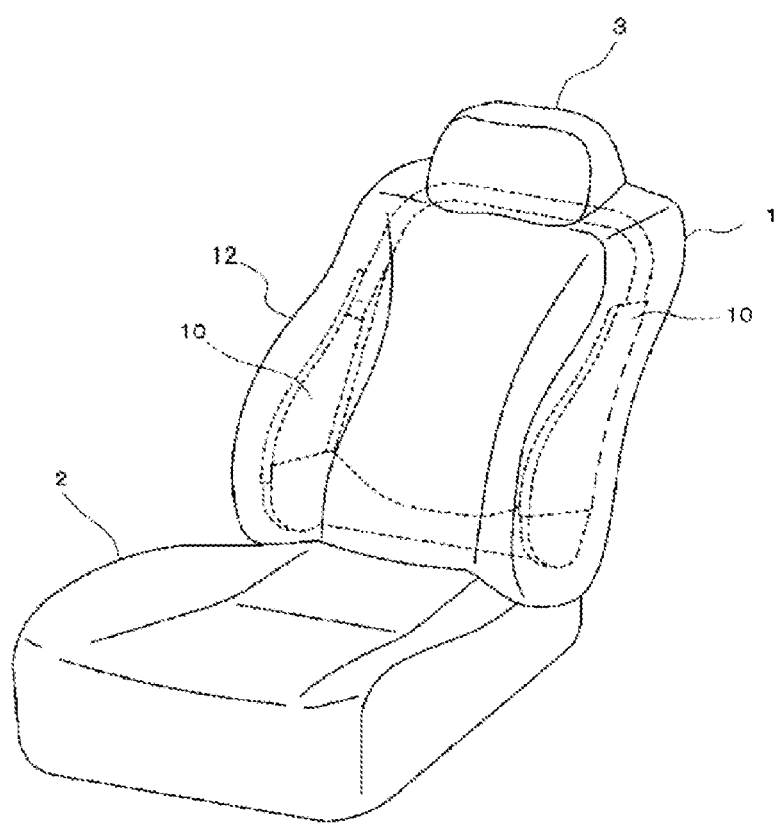
FIG. 1 is a perspective view primarily illustrating an external shape of a vehicle seat according to the present invention, with an illustration of a side airbag device omitted.
Figure 2:
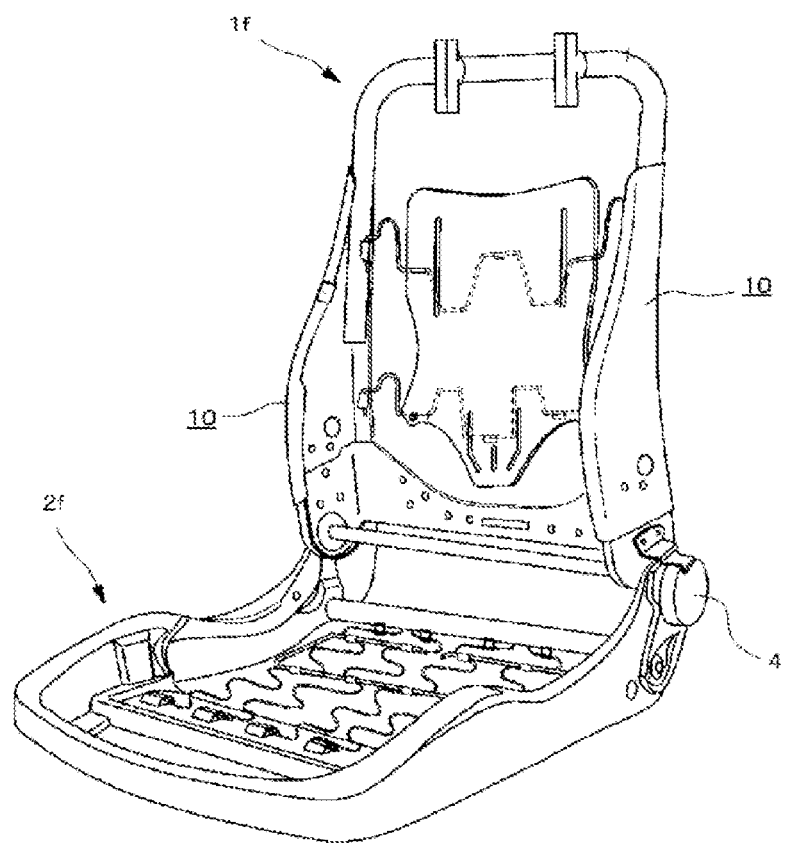
FIG. 2 is a perspective view illustrating an internal structure (seat frame) functioning as a framework of the vehicle seat illustrated in FIG. 1, with an illustration of the side airbag device omitted.
Figure 3:
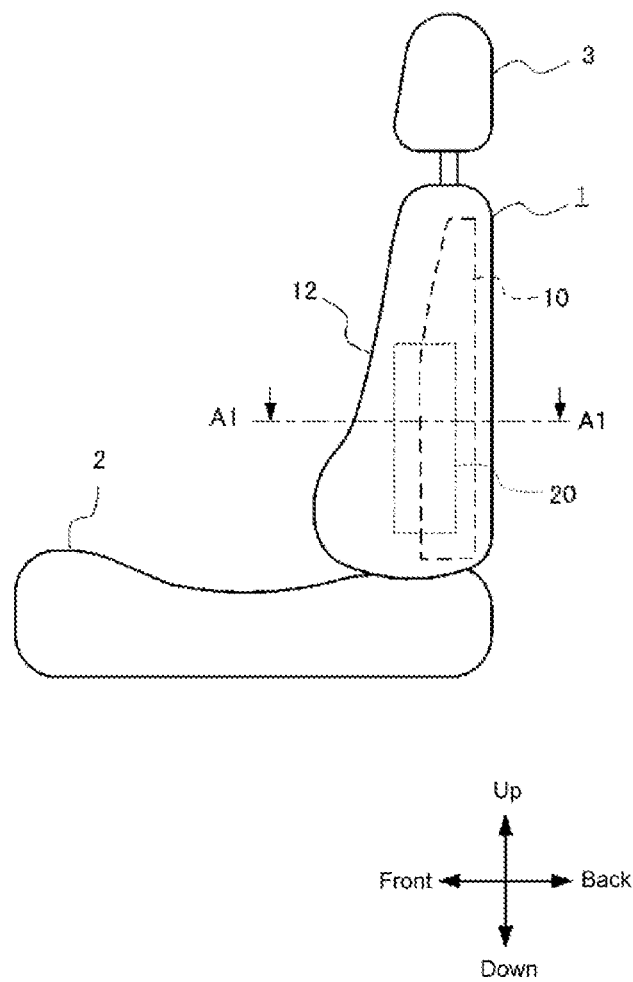
FIG. 3 is a schematic side surface view of the vehicle seat according to the present invention, schematically illustrating a condition where the side airbag device is stored therein, observed from the outside in the vehicle width direction.
Figure 4:
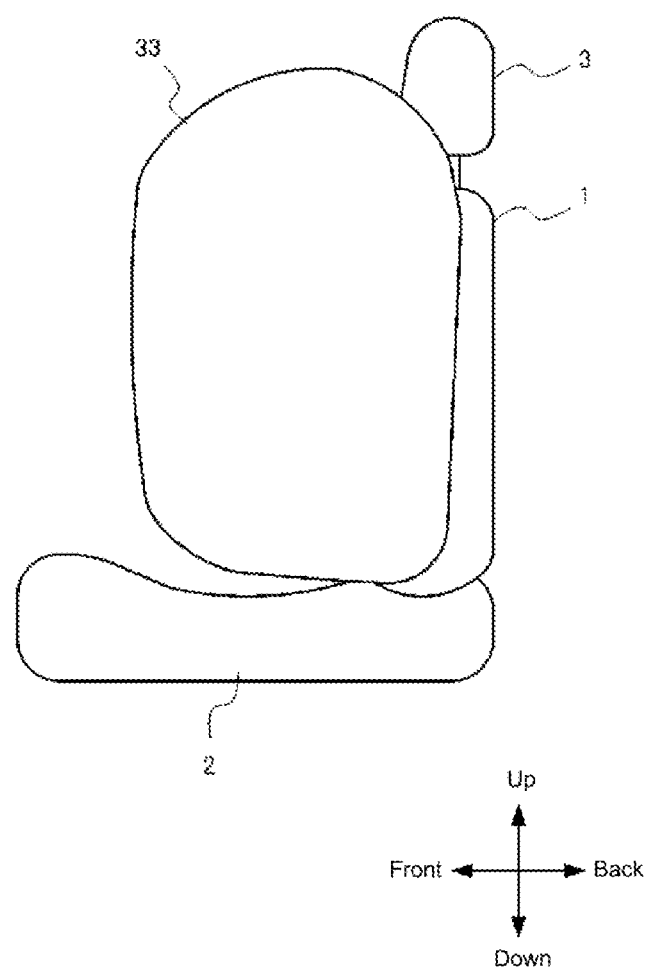
FIG. 4 is a schematic side view of the vehicle seat according to the present invention, illustrating a condition where the airbag cushion is deployed as observed from the outer side in the vehicle width direction.

FIG. 1 is a perspective view primarily illustrating an external shape of a vehicle seat according to the present invention, with an illustration of an airbag device (airbag module) 20 omitted. FIG. 2 is a perspective view illustrating an internal structure (seat frame) functioning as a framework of the vehicle seat illustrated in FIG. 1, with an illustration of the airbag device (airbag module) 20 omitted herein as well. FIG. 3 is a schematic side surface view of the vehicle seat according to the present invention, illustrating a condition where the airbag device (airbag module) 20 is stowed on a side surface (near side) near a left side seat door as observed from the outside in the vehicle width direction. FIG. 4 is a schematic side view of the vehicle seat according to the present invention, illustrating a condition where the airbag cushion is deployed as observed from the outer side in the vehicle width direction.

As illustrated in FIG. 1 and FIG. 2, the vehicle seat in the present embodiment, when viewed as a part, is composed of a seat cushion 2 of a portion in which an occupant is seated, a seat back 1 forming a backrest, and a headrest 3 connected to the upper end of the seat back 1.

As illustrated in FIG. 2, a seat back frame 1f forming a skeleton of the seat is provided inside the seat back 1, a pad 16 (see FIG. 5) made of a urethane foam material or the like is provided on a surface and periphery thereof, and a surface of the pad 16 is covered with a surface skin 14 such as leather, fabric, or the like. A seating frame 2f is provided on a bottom side of the seat cushion 2, and similar to the seat back 1, a pad made of a urethane foam material or the like is provided on an upper surface and periphery thereof, and a surface of the pad is covered by the surface skin 14 (FIG. 5) such as leather, fabric, or the like. The seating frame 2f and the seatback frame 1f are connected via a reclining mechanism 4.

As illustrated in FIG. 2, the seat back frame 1f is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned component outside a headrest frame.

Example 1

Figure 5:
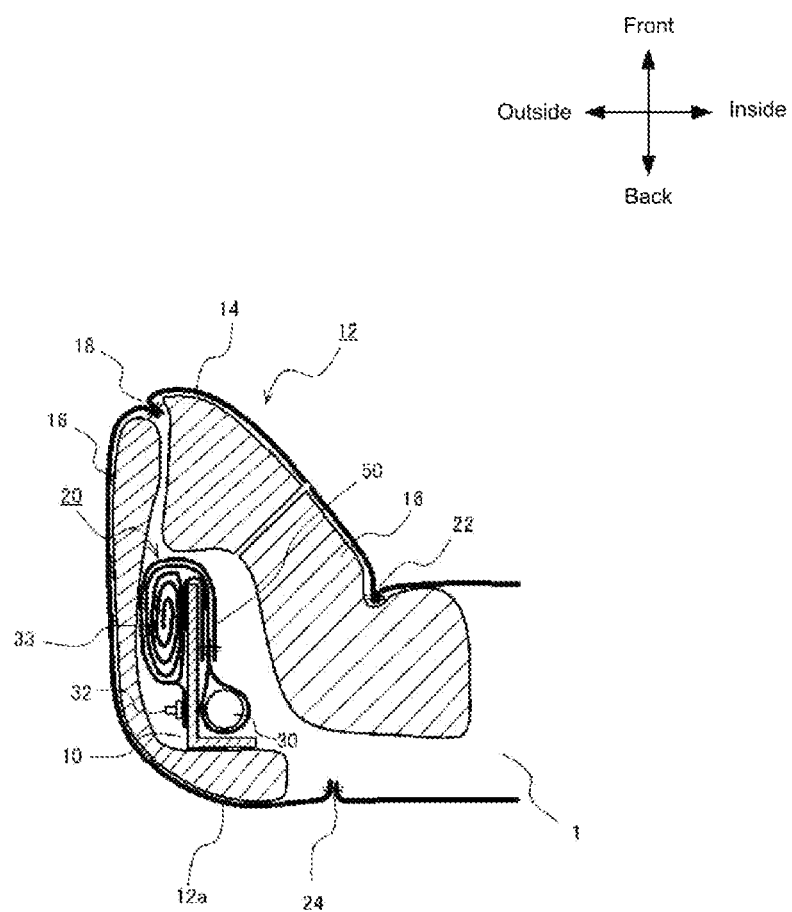
FIG. 5 is a cross sectional view illustrating the structure of the vehicle seat according to Embodiment 1 of the present invention, corresponding to a part of a cross section along the line A1-A1 of FIG. 3.

FIG. 5 is a cross sectional view illustrating the structure of the vehicle seat according to the present invention, corresponding to a part of a cross section in an A1-A1 direction of FIG. 3. The side frame 10 can be molded of resin or metal and, as illustrated in FIG. 5, can be formed into an L-shaped cross sectional shape or a U-shaped cross sectional shape. An airbag module (side airbag device) 20 is secured to the side frame 10.

As illustrated in FIG. 5, the seat back 1 includes a side supporting part 12 which swells in the vehicle traveling direction (vehicle front) on a side part (end part) in the vehicle width direction. A urethane pad 16 is arranged inside the side supporting part 12, and the side airbag device 20 is stowed in a gap of the urethane pad 16. The side airbag device 20 includes: an airbag cushion 33 that restrains an occupant when expanded and deployed; and an inflator 30 that supplies expansion gas to the airbag cushion 33. The inflator 30 includes stud bolts 32 penetrating outward from the inner side of the seat frame 10.

Seams 18, 22, 24 of the skin 14 of the seat back 1 are interwoven and connected by sewing. Note that the front seam 18 is cleft when the airbag cushion 33 is deployed.

The airbag cushion 33 can be formed by stitching around two separate sheets of flexible material, or by folding one sheet in half and stitching the periphery of the two layers. Alternatively, a so-called "one-piece weaving" technique may be employed in which the warp threads and weft threads forming two layers are woven in a selected section and integrally formed into a bag shape with a woven structure of two sheets.

The fabric for producing the airbag cushion 33 is preferably a fabric with plasticity, and for example, a fabric formed by weaving warp threads and weft threads of polyamide fibers can be used. Note that thermoplastic material may be coated on fabric not having plasticity.

The airbag cushion 33 has an opening (not illustrated) for inserting the cylindrical inflator 30 into the airbag cushion 33. One end of the inflator 30 is exposed from the airbag cushion 33, and a control cable that supplies a signal for ignition is connected in this section. The outer surface of the inflator 30 is provided with a pair of stud bolts 32 extending outward, and is secured to the seat frame 10 through holes formed in the airbag cushion 33.

As illustrated in FIG. 5, the airbag device 20 according to the present Embodiment is formed of a ductile material that melts and shrinks by heating and pressurizing, and includes a cover member 50 that retains the airbag cushion 33.

Figure 6A:
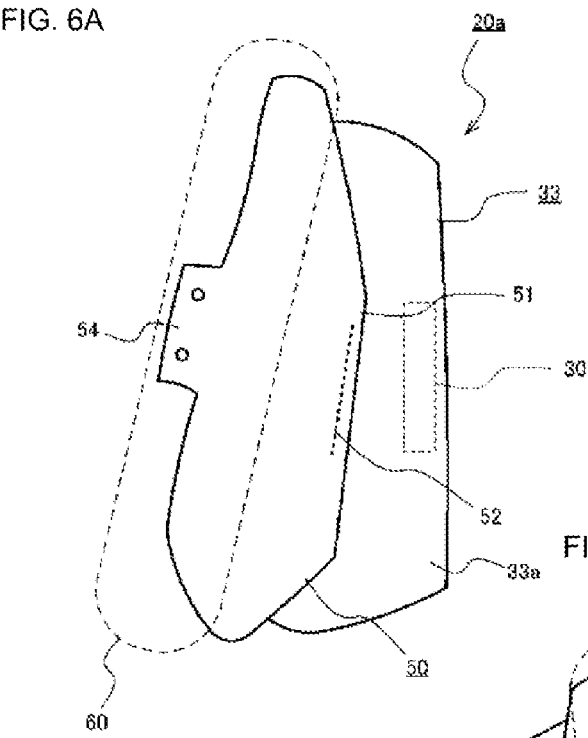
FIGS. 6(A) and 6(B) are plan views illustrating the positional relationship, the structure of the cover member, and the airbag cushion according to Embodiment 1, where
Figure 6B:
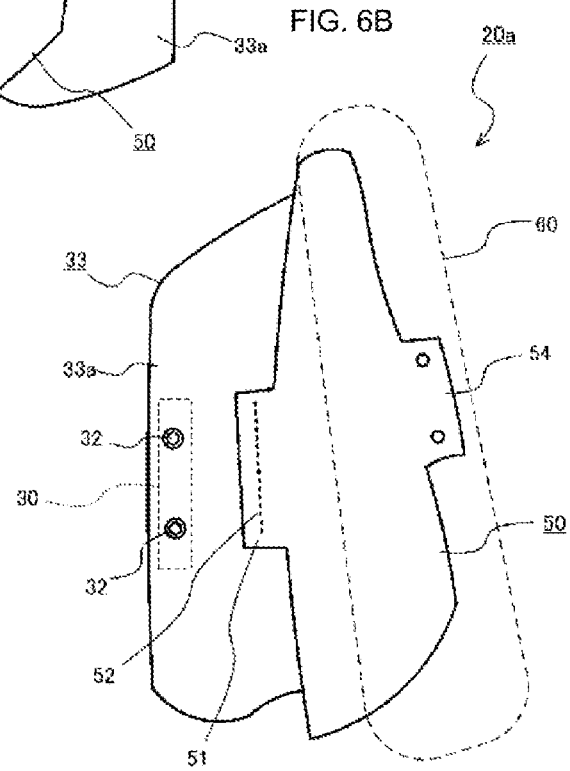
Figure 7:
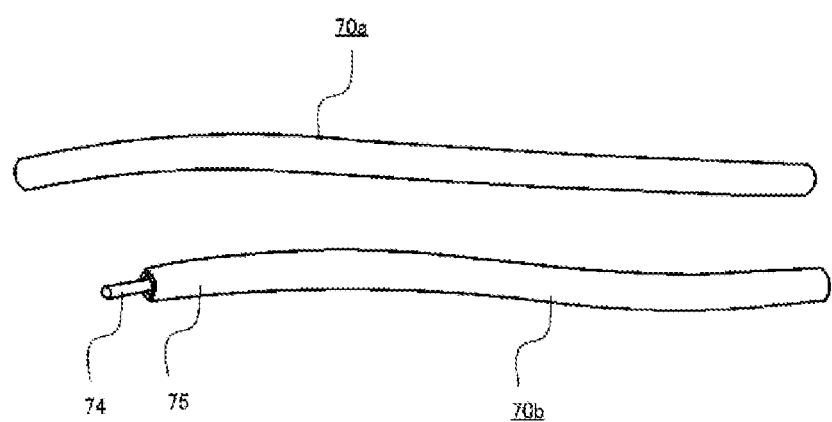
FIG. 7 is a schematic view illustrating a structure of a fiber used in manufacturing a cover member.
Figure 9:
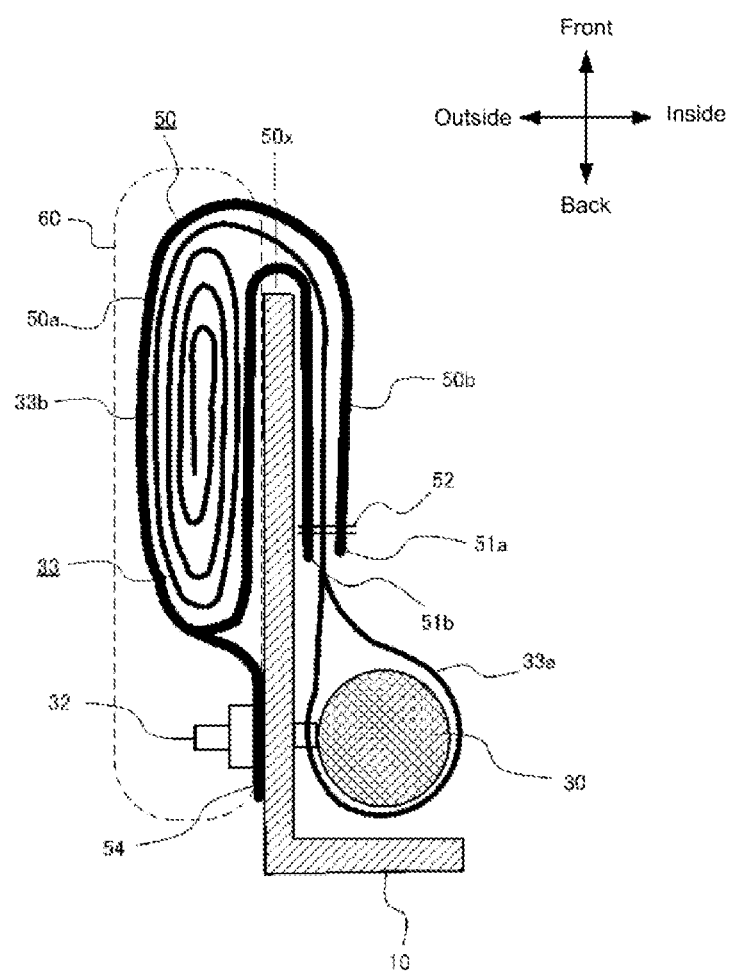
FIG. 9 is a cross-sectional view illustrating the airbag device according to Embodiment 1 attached to the seat frame.

FIGS. 6(A) and 6(B) are plan view illustrating the positional relationship, the structure of the cover member 50, and the airbag cushion 33 according to Embodiment 1, where FIGS. 6(A) and 6(B) are the front and rear respectively. FIG. 7 is a schematic diagram illustrating a structure of a fiber used in manufacturing the cover member 50. FIGS. 8(A) and 8(B) are cross-sectional views illustrating the structure of the airbag cushion 33 and the cover member 50 according to Embodiment 1, where FIG. 8(A) illustrates a state before the heating and pressurizing step, and FIG. 8(B) indicates a state after the heating and pressurizing step. FIG. 9 is a cross-sectional view illustrating the airbag device 20 according to Embodiment 1 attached to the seat frame 10.

As illustrated in FIG. 8(A), FIG. 8(B) and FIG. 9, the airbag cushion 33 includes a rear chamber section 33a that is where the inflator 30 is stowed, and a front chamber section 33b that extends forward from the rear chamber section 33a arranged on the outer side of the seat frame 10 when stowed. Note that the rear chamber section 33a and the front chamber section 33b of the airbag cushion 33 can be distinguished from the front and rear of the folded back section 50x.

As illustrated in FIGS. 6(A) and 6(B), the front chamber section 33b of the rolled airbag cushion 33 is stowed inside the bag-shaped cover member 50, but the rear chamber section 33a is exposed.

The cover member 50 is configured to compress and retain the section of the airbag cushion 33 by heating and pressurizing the prescribed region 60 corresponding to the front chamber section 33b of the airbag cushion 33.

Specifically, the material of the cover member 50 may take the form of a non-woven fabric including a plurality of polymer fibers. The non-woven fabric is provided as felt. The felt can be molded to have a thickness of around 4.25 mm and a density of 300 g/m². Regarding the present Embodiment, polyester felt manufactured by a known needle method in which polyester fibers are entangled by needle processing and secured to each other can be adopted as the non-woven fabric material (cover member 50). Polyester fibers can be provided as polyethylene terephthalate (PET), wherein the felt may be made of 100% PET. Moreover, the felt used in the present Embodiment may include two kinds of fibers with different structures.

FIG. 7 is a schematic diagram illustrating a structure of a fiber used in manufacturing the cover member 50. The upper fiber 70a in FIG. 7 is a monocomponent fiber that is made entirely of PET. Specifically, it is assumed that all of the monocomponent fibers 70a are formed of PET homopolymer. In contrast, the lower fiber 70b of FIG. 7 is a bicomponent composite fiber having a discrete core 74 and a shell 75 surrounding the core. The core 74 and shell 75 of the bicomponent composite fibers 70b are configured to have different properties, specifically different melting points, such that the shell 75 has a significantly lower melting point than the core 74 (for example, in the range of 120 to 150° C.). Bicomponent composite fibers 70b can also be formed entirely of PET, but the core 74 can be formed of PET homopolymers and the shell 75 can be formed of PET copolymers (coPET). When such a PET and coPET are combined, while the melting point of the shell 75 is lower than the melting point of the core 74, overall, the fibers 70b can be assuredly formed of PET. Both the core 74 of the bicomponent composite fibers 70b and the monocomponent fibers 70a are formed of PET homopolymers and therefore have the same melting point, with the monocomponent fibers 70a having a melting point higher than the shell 75 of the bicomponent composite fibers 70b.

The bicomponent composite fibers 70b are equally distributed to the overall monocomponent fibers 70a in felt materials. The bicomponent composite fibers 70b can account for 30% to 60% of all fibers of felt materials, while all the remaining fibers can be monocomponent fibers 70a.

Again, as shown in FIGS. 6(A) and 6(B) and FIGS. 8(A) and 8(B), the front chamber section 33b of the airbag cushion 33 is stowed in a roll or folded state. Additionally, the airbag cushion 33 when stowed has a structure having a bent part 50x that bends at a front edge section of the seat frame 10 between the front chamber section 33b and the rear chamber section 33a.

The cover member 50 is not heated at least at a location corresponding to the bent part 50x of the airbag cushion 33. As a result, as illustrated in FIG. 9, flexibility of the bent part 50x is ensured, the airbag cushion 33 can be easily bent, and the airbag cushion 33 can be stowed in a state of close contact with the seat frame 10.

The cover member 50 can be distinguished from the front cover region 50a surrounding at least the front chamber section 33b of the airbag cushion 33 and the rear cover region 50b that extends behind the front cover region 50a and covers at least a section of the rear chamber section 33a of the airbag cushion 33. The rear cover region 50b has a first rear end part 51b positioned on the inner side of the rear end of the cover member 50 and a second rear end part 51a positioned on the outside.

The tip end part of the front cover region 50a of the cover member 50 is provided with a tab 54 coupled to the stud bolts 32 that pass through the seat frame 10. Such a tab 54 is adapted to be heated and pressurized together with the front cover region 50a.

Both the first and second rear end parts 51b, 51a of the cover member 50 are coupled by frangible stitching 52 to the rear chamber section 33a of the airbag cushion 33.

In this case, when the airbag cushion 33 starts to expand, the stitching section 52 breaks and the cover member 50 releases retention of the airbag cushion 33 in a compressed state.

Production and Assembly Steps

The airbag device 20 according to the present Embodiment is manufactured by the following process, and is assembled on a seat.

Step 1

The inflator 30 is stowed in the rear chamber section 33a of the airbag cushion 33.

Step 2

The front chamber section 33b of the airbag cushion 33 is compressed into a rolled or folded state.

Step 3

The first intermediate package 20a is formed by arranging the cover member 50 so as to partially cover the front chamber section 33b and rear chamber section 33a (see FIGS. 6(A) and 6(B) and FIG. 8(A)).

Step 4

The second intermediate package 20b is formed by heating and pressurizing a section 60 of the cover member 50 to further compress the front chamber section 33b of the airbag cushion 33 (see FIG. 8(B)). For example, the first intermediate package 20a is placed in a prescribed mold and pressurized while heating. The heating step is performed at a temperature above the melting point of the shell 75 of the bicomponent composite fiber 70b but below the melting point of the core 74 of the bicomponent composite fiber 70b as well as the monocomponent fiber 70a.

Note that the heating step and the pressurizing step are performed simultaneously, but need not necessarily be completely simultaneous from the beginning to end. For example, heat can be applied prior to applying pressure to the first intermediate package 20a. What is important is that there is at least some time where heat and pressure are applied simultaneously to the intermediate package.

The pressurizing step applies a pressure of 5 to 200 kN to the first intermediate package 20a, and the temperature is maintained at a higher temperature than the melting point of the shell 75 of the bicomponent composite fiber 70b. The time at which the heating step and the pressurization step overlap can be less than 2 minutes depending on the nature of the cover member 50 material.

If the airbag cushion 33 is formed of a cloth with plasticity, the fabric forming the airbag cushion 33 is plastically deformed by compression by simultaneously adding pressure and heat to the first intermediate package 20a. The roll-shaped front chamber section 33b in the second intermediate package 20b is then flattened.

If the airbag cushion 33 is not made of a plastically deformable material, the simultaneous application of pressure and heat to the first intermediate package 20a will cause the felt material of the cover member 50 to become thinner (for example, 0.55 mm), which then plastically deforms. More specifically, when heated at a temperature higher than the melting point of the shell 75 of the bicomponent composite fiber, the shell 75 melts. Therefore, the shell 75 is fused together at all positions in which the fibers of the cover member 50 are distributed. However, since the cover member 50 is heated at a temperature lower than the melting point of the core 74 of the bicomponent composite fiber 70b and the total structure of the monocomponent fiber 70a, the core 74 and the monocomponent fiber 70a remain in solid phase, and are not fused to each other. As a result, only material of the shell 75 will be fused.

By fusing only the shell 75 of the bicomponent composite fibers distributed over the entire cover member 50, the second intermediate package 20b retains a three-dimensional shape thereof even after the package is removed from the press after the process of simultaneously heating and pressurizing is complete. In this manner, the cover member 50 can securely retain the roll-shaped airbag cushion 33 (33b) in the compressed state generated in the pressurizing step. Note that the entirety of the core 74 of the bicomponent composite fiber 70b and the monocomponent fiber 70a are not fused together, and thus the cover member 50 remains soft and slightly pliable.

Step 5

The inflator 30 is secured on the inner side of the seat frame 10.

Step 6

A portion 50x between the front chamber section 33b and the rear chamber section 33a of the airbag cushion 33 is bent, and the front chamber section 33b is folded back at the outer side of the seat frame 10 (FIG. 9).

Step 7

As illustrated in FIG. 9, the tab 54 of the cover member 50 is connected to the stud bolts 32.

As described above, with the present invention, the region corresponding to at least the front chamber section 33b of the airbag cushion 33 is heated and pressurized with respect to the cover member 50 retaining the airbag cushion 33 to compress and retain the relevant section of the airbag cushion 33. In other words, this accounts for a major section of the airbag cushion 33, retaining the section (33b) arranged on the outer side of the seat frame 10 in a compressed state by the cover member 50. Herein, since the heated and pressurized cover member 50 melts and shrinks, the relevant section of the cover member 50 becomes harder than the other sections, improving the form retaining properties thereof. On the other hand, the rear chamber section 33a where the inflator 30 is stowed is not compressed via the cover member 50, and thus maintains a relatively flexible state, and is easily bent.

Embodiment 2

Figure 10:
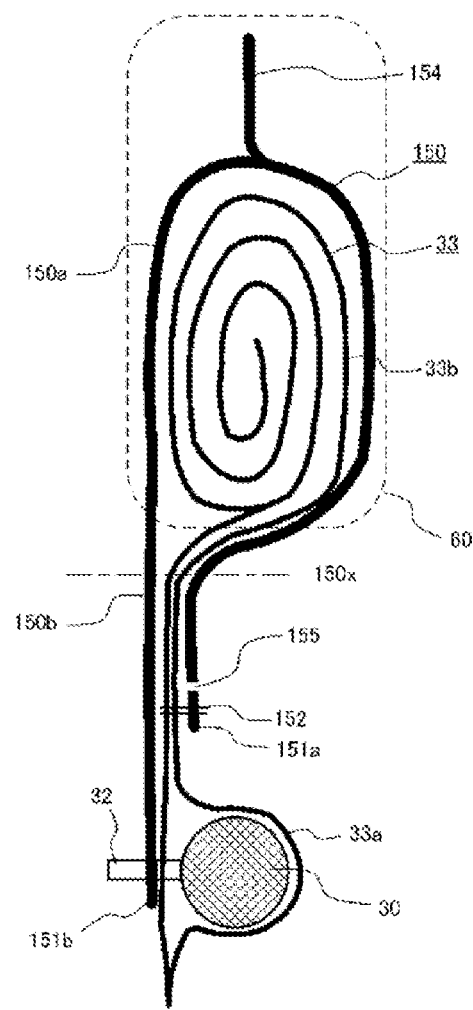
FIG. 10 is a cross-sectional view illustrating the structure of the airbag cushion and the cover member according to Embodiment 2 of the present invention, and illustrates the state before the heating and pressurizing step.
Figure 11:
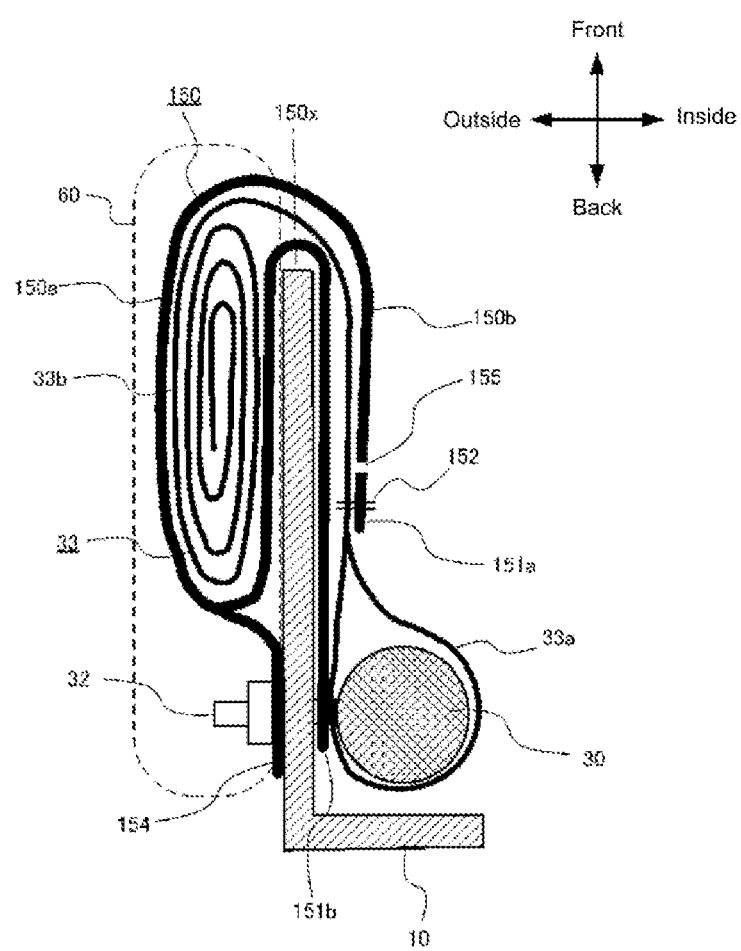
FIG. 11 is a cross-sectional view illustrating the airbag device according to Embodiment 2 attached to the seat frame.

FIG. 10 is a cross-sectional view illustrating the structure of the airbag cushion 33 and the cover member 150 according to Embodiment 2 of the present invention, and indicates a state before the heating and pressurization step (first intermediate package). FIG. 11 is a cross-sectional view illustrating the airbag device according to Embodiment 2 attached to the seat frame 10.

In this Embodiment, the same reference numerals are given to substantially the same components as in Embodiment 1 described above. Components corresponding to those of Embodiment 1 but changed are assigned reference numerals in the 100s. For example, the cover member is "50" in Embodiment 1, but is "150" in Embodiment 2. Duplicate descriptions will be omitted, and only differences will be described.

In the present Embodiment, the first rear end part 151b of the cover member 150 is secured to the stud bolts 32 on the inner side of the seat frame 10. Also, the second rear end part 151a of the cover member 150 is connected by stitching 152 to the rear chamber section 33a of the airbag cushion 33.

A frangible slit 155 is formed in the second rear end part 151a of the cover member 150 in the vicinity of the stitching 152. When the airbag cushion 33 starts to deploy, the cover member 150 is reliably broken at the slit 155, and interference between the airbag cushion 33 and the cover member 150 can be minimized.

Embodiment 3

Figure 12:
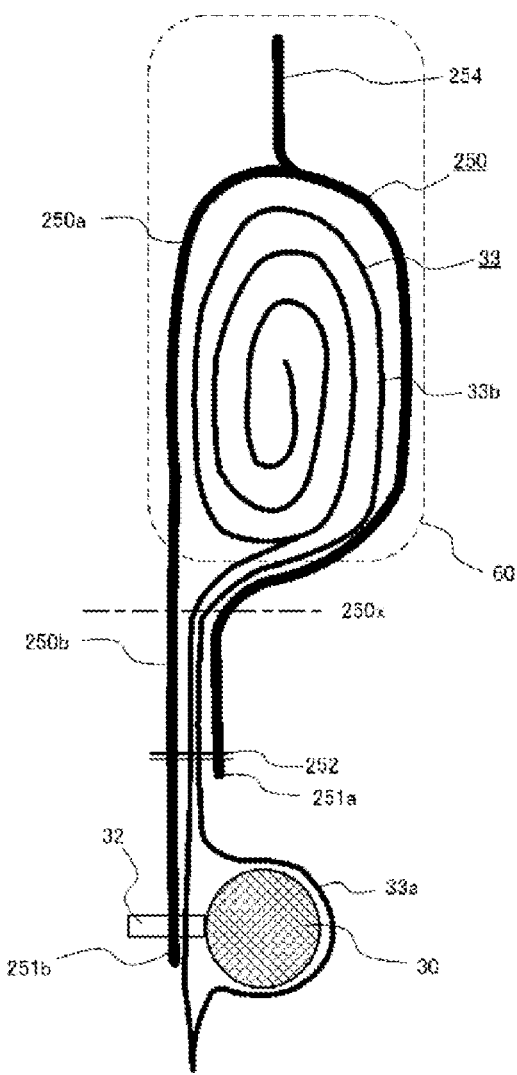
FIG. 12 is a cross-sectional view illustrating the structure of the airbag cushion and the cover member according to Embodiment 3 of the present invention, and illustrates the state before the heating and pressurizing step.
Figure 13:
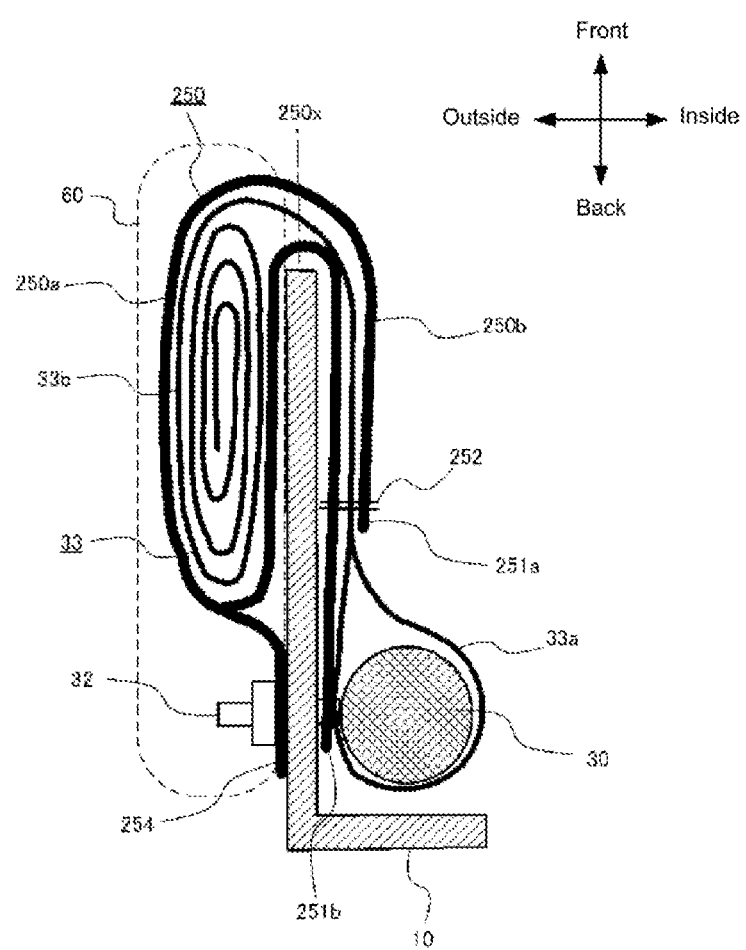
FIG. 13 is a cross-sectional view illustrating the airbag device according to Embodiment 3 attached to the seat frame.

FIG. 12 is a cross-sectional view illustrating the structure of the airbag cushion 33 and the cover member 250 according to Embodiment 3 of the present invention, and illustrates a state before the heating and pressurizing step (first intermediate package). FIG. 13 is a cross-sectional view illustrating the airbag device according to Embodiment 3 attached to the seat frame 10.

In this Embodiment, the same reference numerals are given to substantially the same components as in Embodiment 1 described above. Components corresponding to those of Embodiment 1 but changed are assigned reference numerals in the 200s. For example, the cover member is "50" in Embodiment 1, but is "250" in Embodiment 3. Duplicate descriptions will be omitted, and only differences will be described.

In the present Embodiment, similar to Embodiment 2 above, the second rear end part 251b of the cover member 250 is connected to the stud bolts 32 of the inflator 30 on the inner side of the seat frame 10. Also, the first rear end part 251b and the second rear end part 251a of the cover member 250 are both connected by stitching 252 to the rear chamber section 33a of the airbag cushion 33.

Embodiment 4

Figure 14:
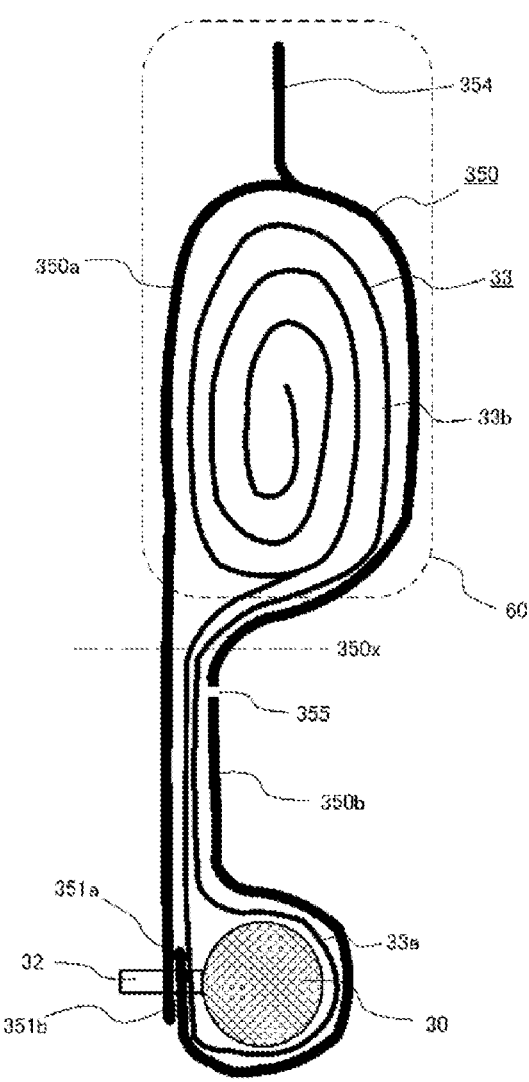
FIG. 14 is a cross-sectional view illustrating the structure of the airbag cushion and the cover member according to Embodiment 4 of the present invention, and illustrates the state before the heating and pressurizing step.
Figure 15:
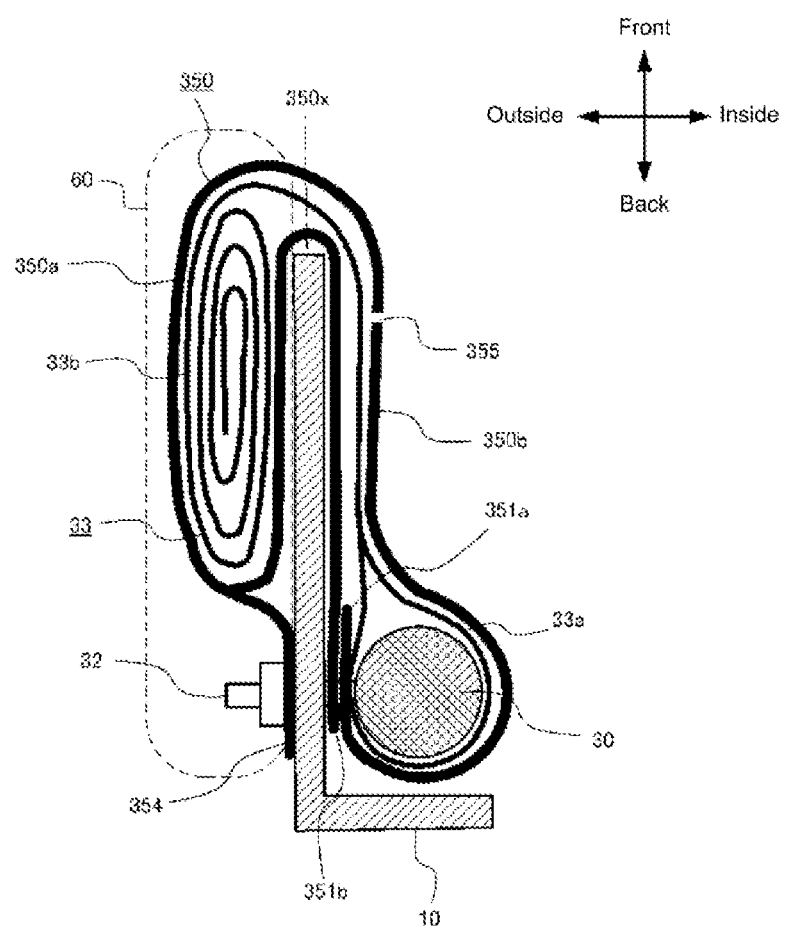
FIG. 15 is a cross-sectional view illustrating the airbag device according to Embodiment 4 attached to the seat frame.

FIG. 14 is a cross-sectional view illustrating the structure of the airbag cushion 33 and the cover member 250 according to Embodiment 4 of the present invention, and illustrates the state before the heating and pressurization step (first intermediate package). FIG. 15 is a cross-sectional view illustrating the airbag device according to Embodiment 4 attached to the seat frame 10.

In this Embodiment, the same reference numerals are given to substantially the same components as in Embodiment 1 described above. Components corresponding to those of Embodiment 1 but changed are assigned reference numerals in the 300s. For example, the cover member is "50" in Embodiment 1, but is "350" in Embodiment 3. Duplicate descriptions will be omitted, and only differences will be described.

In the present Embodiment, both the first rear end part 351b and the second rear end part 351a are secured to stud bolts 32 such that the rear cover region 350b of the cover member 350 surrounds the rear chamber section 33a of the airbag cushion 33. A slit 355 is formed in a section of the rear cover region 350b of the cover member 350.

In the present Embodiment, since the cover member 350 surrounds not only the front chamber section 33b of the airbag cushion 33 but also the entirety of the rear chamber section 33a thereof, the second intermediate package (20b) including the airbag cushion 33, cover member 350, and inflator 30 can be reliably attached to the seat frame 10 in a preferred orientation.

Although the present invention has been described with reference to embodiments, the present invention is not limited in any way to these embodiments, and can be changed as appropriate within the scope of the technical idea of the present invention. For example, while a side airbag on the near side has been predominantly mentioned in the embodiments described above, use is also possible with a far side airbag (surface on the far side from a vehicle door of a vehicle seat), in very small vehicles such as a single seat vehicle (irrespective of the presence of a door, a vehicle including parts with only one seat in a single row), and the like.

In addition, although the present invention specifically describes Embodiments using a felt type non-woven fabric, woven fabric can also be used as long as the material has ductility.

What is claimed is:

1. An airbag device that is stowed in a vehicle seat, comprising:
    an airbag cushion that restrains an occupant by expanding and deploying;
    an inflator disposed on the inner side of the vehicle seat frame that supplies expansion gas to the airbag cushion; and
    a cover member formed of a ductile material that melts and shrinks under heat and pressure to retain the airbag cushion, wherein
    the airbag cushion includes a rear chamber section for stowing the inflator and a front chamber section extending forward from the rear chamber section arranged on the outer side of the seat frame when stowed, and
    the cover member is configured to compress and retain the relevant section of the airbag cushion by heating and pressurizing at least a region corresponding to the front chamber section of the airbag cushion.

2. The airbag device according to claim 1, wherein the front chamber section of the airbag cushion is stowed in a rolled or folded state.

3. The airbag device according to claim 1, wherein the airbag cushion when stowed has a bent part between the front chamber section and the rear chamber section that bends at the front edge section of the seat frame.

4. The airbag device according to claim 3, wherein the cover member is not heated and compressed in the location corresponding to the bent part of the airbag cushion.

5. The airbag device according to claim 1, wherein the cover member is made of a ductile cloth material containing a plurality of polymer fibers, and at least a part of the fibers are fused to each other so as to retain a prescribed shape.

6. The airbag device according to claim 1, wherein the cover member includes:
    a front cover region surrounding at least the front chamber section of the airbag cushion, and
    a rear cover region extending rearward from the front cover region that covers at least a part of the rear chamber section of the airbag cushion; wherein
    the rear cover region includes:
    a first rear end part positioned on the inner side of the rear end of the cover member, and
    a second rear end part positioned on the outer side thereof.

7. The airbag device according to claim 6, wherein the inflator is secured to the seat frame by a stud bolt, and a tab connected to the stud bolts penetrating to the outside of the seat frame is provided at an end part of the front cover region of the cover member.

8. The airbag device according to claim 7, wherein the tab is heated and compressed.

9. The airbag device according to claim 8, wherein both the first and second rear end parts of the cover member are connected to the rear chamber section of the airbag cushion by breakable stitching.

10. The airbag device according to claim 8, wherein the second rear end part of the cover member is secured to the stud bolts on the inner side of the seat frame.

11. The airbag device according to claim 10, wherein the first rear end part of the cover member is connected to the rear chamber section of the airbag cushion by stitching.

12. The airbag device according to claim 8, wherein a frangible slit is formed in the vicinity of the stitching in the first rear end part of the cover member.

13. The airbag device according to claim 8, wherein both the first rear end part and second rear end part are secured to the stud bolts such that the rear cover region of the cover member surrounds the rear chamber section of the airbag cushion.

14. The airbag device according to claim 13, wherein a slit is formed on a part of the rear cover region of the cover member.

15. A manufacturing method of an airbag device stowed in a vehicle seat, comprising:
    a step of stowing an inflator in a rear chamber section of an airbag cushion,
    a step of compressing a front chamber section of the airbag cushion in a rolled or folded state,
    a step of forming a first intermediate package by arranging a cover member made of a ductile material that melts and shrinks under heat and pressure so as to cover at least a part of the front chamber section and rear chamber section,
    a step of forming a second intermediate package by heating and pressurizing a part of the cover member and further compressing the front chamber section of the airbag cushion,
    a step of securing the inflator on the inner side of the seat frame,
    a step of forming a bend in between the front chamber section and rear chamber section of the airbag cushion and arranging the front chamber section on the outer side of the seat frame, and
    a step of connecting the end part of the cover member to the seat frame.

* * * * *